United States Patent
Dijkstra et al.

(10) Patent No.: US 11,104,091 B2
(45) Date of Patent: Aug. 31, 2021

(54) DRUM FOR MANUFACTURING BELT AND TREAD OF A TIRE

(71) Applicant: VMI HOLLAND B.V., Epe (NL)

(72) Inventors: René Dijkstra, Epe (NL); Henk-Jan Grolleman, Eerbeek (NL)

(73) Assignee: VMI HOLLAND B.V., Epe (NL)

( * ) Notice: Subject to any disclaimer, the term of this patent is extended or adjusted under 35 U.S.C. 154(b) by 564 days.

(21) Appl. No.: 14/906,693

(22) PCT Filed: Aug. 14, 2014

(86) PCT No.: PCT/NL2014/050562
§ 371 (c)(1),
(2) Date: Jan. 21, 2016

(87) PCT Pub. No.: WO2015/023183
PCT Pub. Date: Feb. 19, 2015

(65) Prior Publication Data
US 2016/0151990 A1    Jun. 2, 2016

(30) Foreign Application Priority Data

Aug. 15, 2013  (NL) ...................................... 2011308

(51) Int. Cl.
*B29D 30/24* (2006.01)
*B29D 30/28* (2006.01)
(Continued)

(52) U.S. Cl.
CPC ........... *B29D 30/28* (2013.01); *B29D 30/242* (2013.01); *B29D 30/58* (2013.01); *B29D 2030/2685* (2013.01)

(58) Field of Classification Search
CPC ...... B29D 30/242; B29D 30/26; B29D 30/20; B29D 30/24; B29D 30/28; B29D 30/30; B29D 30/3007; B29D 30/58
See application file for complete search history.

(56) References Cited

U.S. PATENT DOCUMENTS 3,813,271 A * 5/1974 Riggs ................... B29D 30/242
156/417
4,063,987 A   12/1977 Irie et al.
(Continued)

FOREIGN PATENT DOCUMENTS

CN    1655922 A    8/2005
CN    1729096 A    2/2006
(Continued)

OTHER PUBLICATIONS

Machine generated English language translation of JP 2012-131167 (original document dated Jul. 2012) (Year: 2012).*
(Continued)

*Primary Examiner* — Geoffrey L Knable
(74) *Attorney, Agent, or Firm* — Birch, Stewart, Kolasch & Birch LLP

(57) ABSTRACT

The invention relates to a method and a building drum (1) for manufacturing a package of a belt layer (6) and a tread layer (7) into a substantially cylindrical tire component, wherein the drum is rotatable about a drum centre line (2) and comprises a rigid support surface (3) for the tire component situated at the outward facing circumferential surface of the drum, wherein the drum comprises two support members (4, 5) which are arranged spaced apart in a substantial longitudinal direction of said drum, wherein the support members (4, 5) each comprises a tread support surface (41, 51) which faces away from the drum centre line and which tread support surfaces are radially movable between a retracted position wherein the tread support surface is arranged at or near the rigid support surface, and a raised position wherein the tread support surface is arranged in a radially outward position with respect to the rigid support surface.

9 Claims, 5 Drawing Sheets

(51) Int. Cl.
*B29D 30/58* (2006.01)
*B29D 30/26* (2006.01)

(56) References Cited

U.S. PATENT DOCUMENTS

| | | | |
|---|---|---|---|
| 4,249,979 A | 2/1981 | Burley | |
| 4,802,937 A | 2/1989 | Szyms | |
| 4,808,257 A | 2/1989 | Rex et al. | |
| 5,330,609 A * | 7/1994 | Dreyer | B29D 30/14 156/412 |
| 5,882,457 A * | 3/1999 | Currie | B29D 30/3007 156/128.1 |
| 5,972,142 A | 10/1999 | Kuroda et al. | |
| 6,105,648 A * | 8/2000 | De Graaf | F16C 13/024 156/412 |
| 6,343,638 B1 * | 2/2002 | Weaver | B29D 30/243 156/414 |
| 6,790,301 B2 * | 9/2004 | Risser | B29D 30/58 156/123 |
| 2006/0037708 A1 | 2/2006 | Mihalik | |
| 2006/0127519 A1 | 6/2006 | Uyttenboogaart | |
| 2007/0095481 A1 | 5/2007 | Graaf et al. | |
| 2007/0246164 A1 | 10/2007 | De Laubier et al. | |
| 2011/0030880 A1 | 2/2011 | Ogawa | |
| 2015/0314543 A1 * | 11/2015 | Marchini | B29D 30/24 156/117 |

FOREIGN PATENT DOCUMENTS

| | | | | |
|---|---|---|---|---|
| CN | 1953866 A | | 4/2007 | |
| CN | 101058234 A | | 10/2007 | |
| CN | 201645846 U | | 11/2010 | |
| DE | 24 58 336 A1 | | 6/1976 | |
| DE | 26 45 178 A1 | | 4/1978 | |
| DE | 39 08 502 A1 | | 9/1990 | |
| EP | 2 286 986 A1 | | 2/2011 | |
| JP | 2001-198991 A | | 7/2001 | |
| JP | 2001-212889 | * | 8/2001 | B29D 30/24 |
| JP | 2001-212889 A | | 8/2001 | |
| JP | 2007-185886 | * | 7/2007 | B29D 30/24 |
| JP | 2007-185886 A | | 7/2007 | |
| JP | 2007-185887 | * | 7/2007 | B29D 30/24 |
| JP | 2007-185887 A | * | 7/2007 | |
| JP | 2009-160850 | * | 7/2009 | B29D 30/24 |
| JP | 2009-214468 | * | 9/2009 | B29D 30/32 |
| JP | 2010-69733 A | | 4/2010 | |
| JP | 2010-105246 A | | 5/2010 | |
| JP | 2012-131167 | * | 7/2012 | B29D 30/30 |
| JP | 2013-146932 | * | 8/2013 | B29D 30/30 |
| SU | 1790518 A3 | | 1/1993 | |
| WO | WO 98/18613 A1 | | 5/1998 | |
| WO | WO 2009/150934 A1 | | 12/2009 | |

OTHER PUBLICATIONS

Machine generated English language translation of JP 2009-214468 (original document dated Sep. 2009) (Year: 2009).*
Machine generated English language translation of JP 2009-160850 (original document dated Jul. 2009) (Year: 2009).*
Machine generated English language translation of JP 2001-212889 (original document dated Aug. 2001) (Year: 2001).*
Machine generated English language translation of JP 2013-146932 (original document dated Aug. 2013) (Year: 2013).*
Machine generated English language translation of JP 2007-185887 (original document dated Jul. 2007) (Year: 2007).*
Machine generated English language translation of JP 2007-185886 (original document dated Jul. 2007) (Year: 2007).*
Machine translation of JP 2001-198991, patent document published Jul. 24, 2001.*
International Search Report, issued in PCT/NL2014/050562, dated Jan. 7, 2015.
Written Opinion of the International Searching Authority, issued in PCT/NL2014/050562, dated Jan. 7, 2015.
Russian Search Report, dated Jun. 27, 2017, for Russian Application No. 2016109000/05.
English translation of a Chinese Search Report, dated Dec. 23, 2016, for Chinese Application No. 201480045220.4.
Japanese Office Action, dated Aug. 14, 2018, for Japanese Application No. 2016-534554, with an English machine translation.
Decision to Grant issued in JP Application No. 2016-534554 dated Jun. 11, 2019.

* cited by examiner

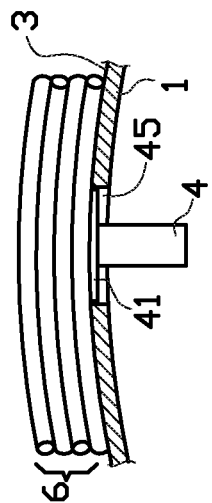
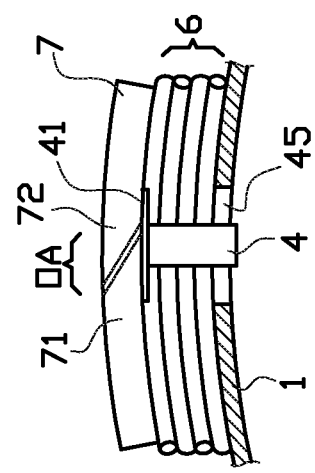
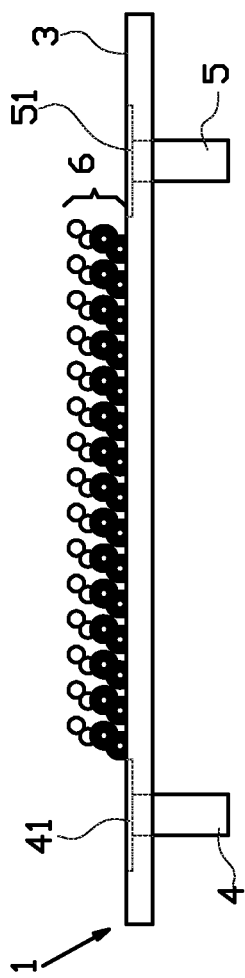
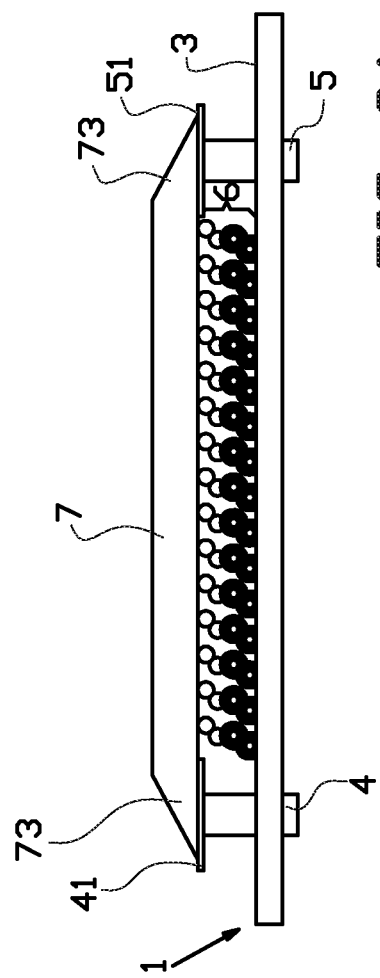

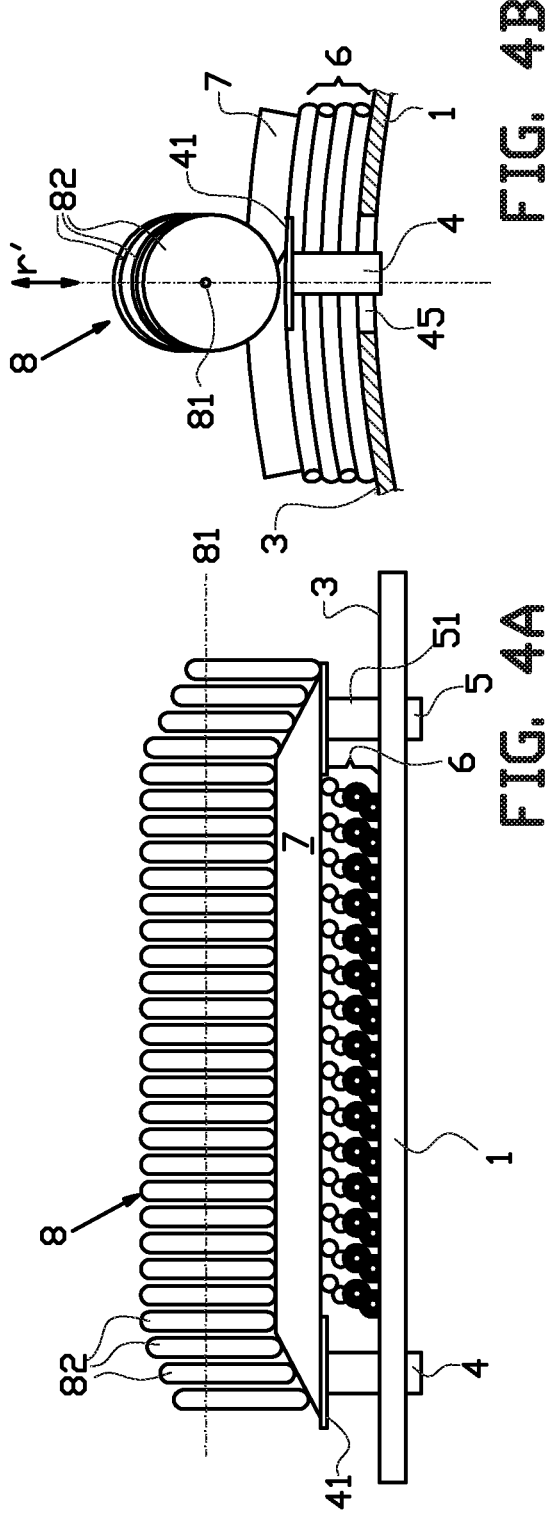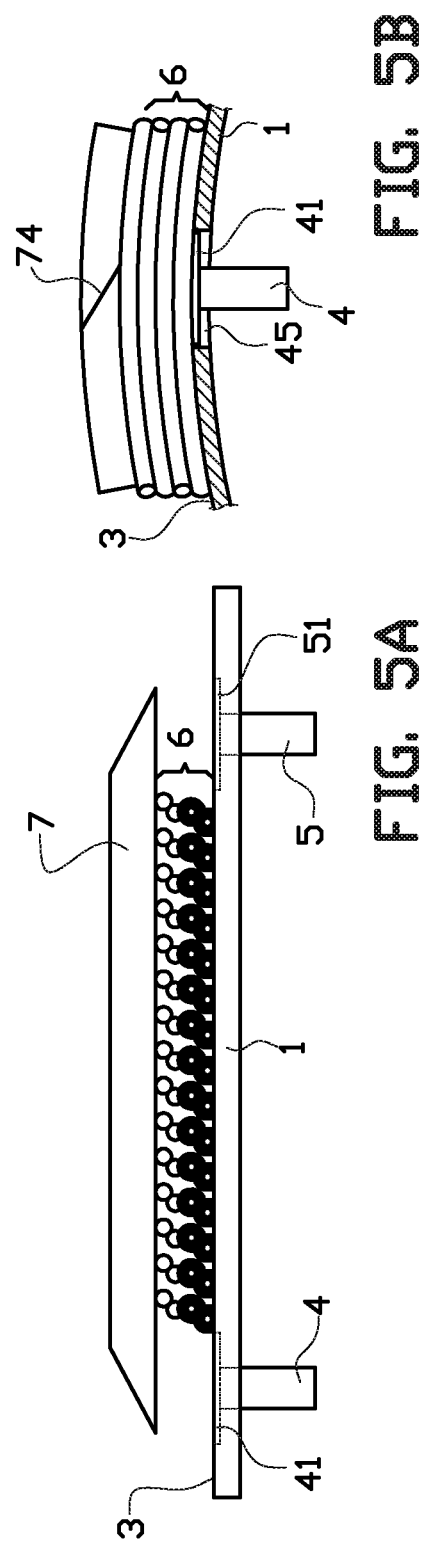

DRUM FOR MANUFACTURING BELT AND TREAD OF A TIRE

BACKGROUND

The invention relates to a method of manufacturing a cylindrical tire component comprising one or more belt layers and a tread layer on a drum. The invention further relates to a belt and tread drum, particularly a drum arranged for applying one or more belt layers on the circumferential surface of said drum, and a tread layer on top of said one or more belt layers.

When manufacturing such a cylindrical tire component, first one or more belt layers are arranged on said belt and tread drum. The belt layers are usually supplied from a belt conveyor which is arranged in close proximity of the belt and tread drum during the transfer of the belt layers onto the circumferential surface of the belt and tread drum. During the transfer of the belt layers onto the circumferential surface of the belt and tread drum, the belt conveyor and the circumferential surface of the belt and tread drum are moved substantially synchronously. Because of the close arrangement of the belt conveyor to the belt and tread drum, the circumferential surface of the belt and tread drum is without protrusions, because any such protrusion might hit against the belt conveyor and damage the belt conveyor and/or disturb the transfer process. When the belt layers are arranged on the circumferential surface, the belt layers are stitched using a stitching roller.

Subsequently, a tread layer is cut to a predetermined length and wound around the belt and tread drum on top of the previously arranged one or more belt layers to finalize the cylindrical tire component. The cutting surface extends substantially perpendicular to the longitudinal direction of the tread layer, and at a sloping angle with respect to the surface of the tread layer. When the tread layer is arranged on said belt and tread drum, a leading and a trailing end of the tread layer are arranged to overlap, which overlap is also denoted as tread splice. This tread splice is at least partially stitched using a stitching roller.

Preferably a multi-disk stitching roller, as for example described in the International Patent Application 98/18613, is used for stitching the belt layers on the belt and tread drum. Such a stitching roller comprises a plurality of substantially identical disks, wherein each of said disks has at least a rotatable outer circumference, and wherein said disks are substantially individual movable in a radial direction relative to the belt and tread drum. The stitching device of this embodiment is adaptable to the profile and shape of the tread layer and is able to provide the required pressing force for stitching the leading end and the trailing end together, substantially independent of the contour or shape of the tread layer.

In case the width of the tread layer is larger than the width of the belt layers, the part of the tread layer that extends beyond the belt layers deforms or may become damaged when the stitching roller exerts pressure onto this part. In addition, the leading and trailing end of the tread layer may be pushed away from each other and are no longer suitable overlapping. Due to one or more of these phenomena, the tread splice is at least not adequately stitched.

One way to obtain a adequate stitched tread splice is to stitch the part of the tread layer that extend beyond the belt layers by hand. However this is solution is very labor-intensive.

It is an object of the present invention to provide a belt and tread drum onto which the tread splice can be stitched, substantially without damaging the edges of the tread layer.

SUMMARY OF THE INVENTION

According to a first aspect, the invention provides a method for manufacturing a package of a belt layer and a tread layer into a substantially cylindrical tire component, wherein the method comprises the steps of:

providing a belt and tread drum which is rotatable about a drum centre line, and comprises a rigid support surface for the tire component, wherein said support surface is situated at the outward facing circumferential surface of the drum, wherein the belt and tread drum comprises two support members which are arranged spaced apart in a substantial longitudinal of said drum, wherein the support members each comprises a tread support surface which faces away from the drum centre line and which tread support surfaces are radially movable with respect to the rigid support surface, wherein the support member is arranged in a retracted position wherein the tread support surface is arranged at or near the rigid support surface, arranging one or more belt layers around the belt and tread drum on the rigid support surface, wherein the one or more belt layers are arranged to run between the two support members, moving the support member into a raised position with respect to the rigid support surface wherein the tread support surface is arranged at a radially outward position with respect to the rigid support surface, arranging a tread layer around the belt and tread drum on the one or more belt layers, wherein a leading end and a trailing end of the tread layer overlap at an overlap area, wherein the tread layer is arranged such that the overlap area is positioned partially on top of said tread support surfaces, and using a stitching device comprising a stitching roll to stitch the overlapping leading end and trailing end of the tread layer together.

Since the overlap area of the leading end and the trailing end of the tread layer is supported by the one or more of belt layers and the edges of the overlap area are supported by the tread support surfaces, the required pressing force for stitching can be applied over substantially the complete width of the tread layer, thus also on the edges of the tread layer. Accordingly the tread splice can be stitched over the complete width of the tread layer, substantially without damaging the edges of the tread layer and/or without disturbing the suitable overlapping of the leading and trailing end.

Since the tread support surfaces are radially movable with respect to the rigid support surface, the circumferential surface of the belt and tread drum is substantially without protrusions when the support member is arranged in the retracted position wherein the tread support surface is arranged at or near the rigid support surface, which is appropriate during at least the transfer of the belt layers onto the belt and tread drum.

In an embodiment, the tread support surfaces are moved in the substantial longitudinal direction of said drum, preferably wherein the tread support surfaces are moved toward each other or away from each other for adjusting the distance between the support members to a width of the one or more belt layers. The belt layer(s) and of the tread layer(s) can have several different widths, for example dependent on the specific tire design. Since the tread support surfaces are movable in the longitudinal direction of said drum, the distance between the tread support surfaces can be adjusted to a width of the one or more belt layers of the second tire design.

In an embodiment, a radial distance between the tread support surfaces in the raised position and the rigid support surface is adjusted to the thickness of the one or more belt layers for a specific tire design. When manufacturing a series of tires of one particular design, the thickness of the one or more belt layers is substantially constant. Thus the distance of travel of the tread support surfaces in the radial direction between the retracted position and the raised position can be substantially constant. In an embodiment the distance of travel of the tread support is adjustable in order to adjust the radially outward position of the tread support surface conform a possible change in the thickness of the one or more belt layers when changing to a differed tire design. Thus the distance of travel of the tread support surfaces between the retracted position and the raised position is adjustable to the required radial outward position of a particular tire design or to the thickness of the one or more belt layers of a particular tire design.

In an embodiment, a radial distance between the tread support surfaces in the retracted position and the rigid support surfaces is arranged to be less than the thickness of one of the one or more belt layers for a specific tire design. In this case the protrusion out of the surface of the belt and tread drum by the support member in the retracted position is less than the thickness of a belt layer and the belt conveyor can be arranged at a suitable distance such that the support members in the retracted position do not interfere with the arranging of the belt layer on the belt and tread drum, and such that the belt layer is adequately supported by the conveyer and the belt and tread drum during the transfer.

In an embodiment, the support member in the retracted position is arranged against and/or abutting the rigid support surface. Preferably, the radial thickness of the tread support members is less than the thickness of a belt layer.

As discussed above, the belt layer(s) usually are supplied to the rigid support surface of the belt and tread drum by means of a conveyor. When arranging the belt layer(s) on the belt and tread drum, said drum is rotated. In order to ascertain that the tread support surfaces do not interfere with the conveyor, the tread support surfaces are preferably arranged in the retracted position when arranging the belt layer(s) on said drum. In an embodiment, the tread support surfaces in the retracted position are arranged substantially flush with or below the rigid support surface.

In an embodiment, both support members are arranged along a support member centre line which extends parallel to the drum centre line, preferably wherein the support members are moved along the support member centre line for adjusting the distance between the support members to a width of the one or more belt layers.

In an embodiment, the stitching roll is rotatable around a stitching roll centre line, wherein the stitching roll centre line is arranged substantially parallel to the drum centre line. In order to stitch the tread splice, the stitching roller only needs to roll over the overlap area and applies the required pressing force to the tread layer at the overlap area. Since the overlap area preferably also extends substantially parallel to the drum centre line, the distance of travel of the stitching roll for stitching the tread splice is small and thus the stitching of the tread splice can be made relatively quick.

In an embodiment, the stitching roll comprises a plurality of substantially identical disks, wherein each of said disks has at least a rotatable outer circumference, and wherein said disks are substantially individual movable in a radial direction relative to the belt and tread drum. The stitching device of this embodiment is adaptable to the profile and shape of the tread layer and is able to provide the required pressing force for stitching the leading end and the trailing end together, substantially independent of the contour or shape of the tread layer.

In an embodiment, the tread layer is wider than the belt layer and the edges of the tread layer in the longitudinal direction of the belt and tread drum are not supported by the belt layer, wherein the tread support surfaces support the edges of the tread layer of the belt and tread drum at the overlap area at both sides of belt layer in the raised position. Preferably, the tread support surfaces support the edges of the tread layer only locally in the circumferential direction of the belt and tread drum at the overlap area at both sides of belt layer in the raised position. Most preferably, the tread support surfaces support the edges of the tread layer only at the overlap area at both sides of belt layer in the raised position. Thus at the overlap area, the tread layer can be supported substantially over its entire width, as shown in FIG. 3A.

According to a second aspect, the invention provides a belt and tread drum for manufacturing a package of a belt layer and a tread layer into a substantially cylindrical tire component, wherein the belt and tread drum is rotatable about a drum centre line, and comprises a rigid support surface for the tire component, wherein the rigid support surface is situated at the outward facing circumferential surface of the belt and tread drum, wherein the belt and tread drum comprises two support members which are arranged spaced apart in a substantial longitudinal direction of said belt and tread drum, wherein the support members each comprises a tread support surface which faces away from the drum centre line and which tread support surfaces are radially movable with respect to the rigid support surface from a retracted position in which the tread support surface is arranged at or near the rigid support surface, to a raised position wherein the tread support surface is arranged in a radially outward position with respect to the rigid support surface, and vice versa, wherein the rigid support surface is arranged for receiving the belt layer between the two tread support surfaces, wherein the belt and tread drum is arranged for receiving the tread layer around its outward facing circumferential surface on the belt layer with a leading end and a trailing end of the tread layer overlapping at an overlap area, wherein the tread layer is wider than the belt layer and the edges of the tread layer in the longitudinal direction of the belt and tread drum are not supported by the belt layer, wherein the tread support surfaces, in the raised position, are arranged for only locally in the circumferential direction of the belt and tread drum supporting the edges of the tread layer at the overlap area at both sides of belt layer.

Thus at the overlap area, the tread layer can be supported substantially over its entire width, as shown in FIG. 3A.

In a preferred embodiment, the tread support surfaces are arranged for supporting the edges of the tread layer only at the overlap area at both sides of belt layer in the raised position.

In an embodiment, the tread support surfaces are movable in the substantial longitudinal direction of said drum.

In an embodiment, the tread support surfaces are movable toward each other and away from each other, for adjusting the distance between the support members.

In an embodiment, a radial distance between the tread support surfaces in the raised position and the rigid support surface, is adjustable to the thickness of the one or more belt layers for a specific tire design.

In an embodiment, a radial distance between the tread support surfaces in the retracted position and the rigid support surfaces is arranged to be less than the thickness of one of the one or more belt layers for a specific tire design.

In an embodiment, the support member in the retracted position is arranged against and/or abutting the rigid support surface In an alternative embodiment, the tread support surfaces in the retracted position are arranged substantially flush with or below the rigid support surface.

In an embodiment, both support members are arranged along a support member centre line which extends parallel to the drum centre line. In an embodiment, the support members are movable along the support member centre line.

According to a third aspect, the invention provides an assembly for manufacturing a package of a belt layer and a tread layer into a substantially cylindrical tire component, wherein said assembly comprises:

a belt and tread drum as described above, and a stitching device comprising a stitching roll which is arranged for stitching a tire component which is arranged at least partially on top of said tread support surfaces.

In an embodiment, the stitching roll is rotatable around a stitching roll centre line, wherein the stitching roll centre line is arranged substantially parallel to the drum centre line.

In an embodiment, the stitching roll comprises a plurality of substantially identical disks, wherein each of said disks has at least a rotatable outer circumference, and wherein said disks are substantially individual movable in a radial direction relative to the belt and tread drum.

The various aspects and features described and shown in the specification can be applied, individually, wherever possible. These individual aspects, in particular the aspects and features described in the attached dependent claims, can be made subject of divisional patent applications.

BRIEF DESCRIPTION OF THE DRAWINGS

The invention will be elucidated on the basis of an exemplary embodiment shown in the attached drawings, in which.

DETAILED DESCRIPTION OF THE INVENTION

The present invention provides a method and apparatus for manufacturing a package of a belt layer and a tread layer into a substantially cylindrical tire component.

Figure 1A:
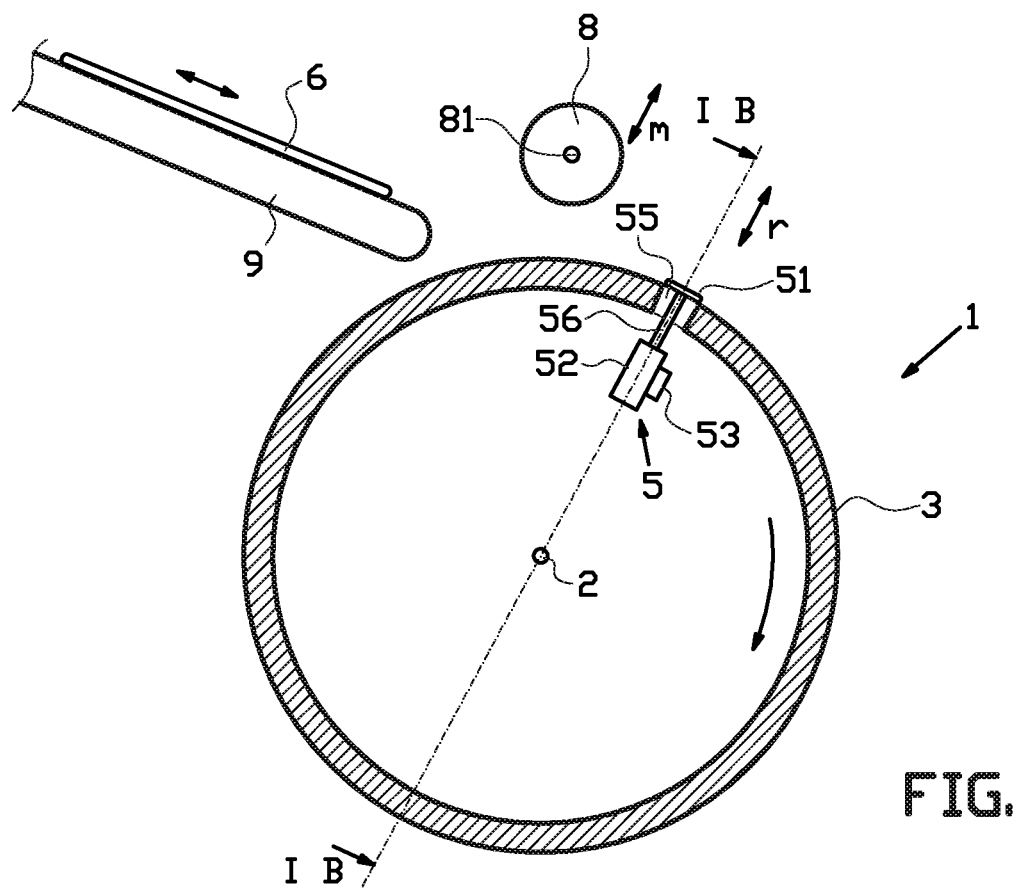
FIG. 1A shows a schematic cross section of a first example of an assembly according to the invention comprising a belt and tread drum and a stitching device, wherein the cross section is taken substantially perpendicular to the drum centre line.
Figure 1B:
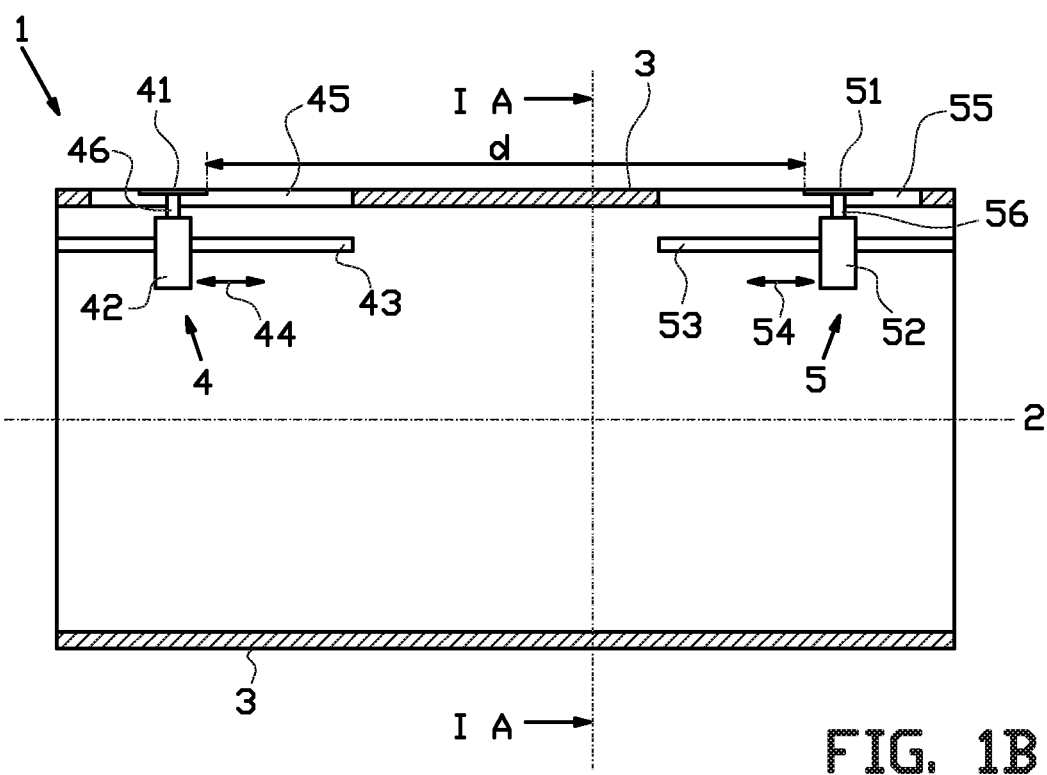
FIGS. 1B and 1C show a schematic cross section in longitudinal direction of the drum of FIG. 1A, FIGS. 2A, 2B, 3A, 3B, 4A, 4B, 5A and 5B schematically show a part of the assembly in cross section at various steps of the method for manufacturing a package of a belt layer and a tread.
Figure 1C:
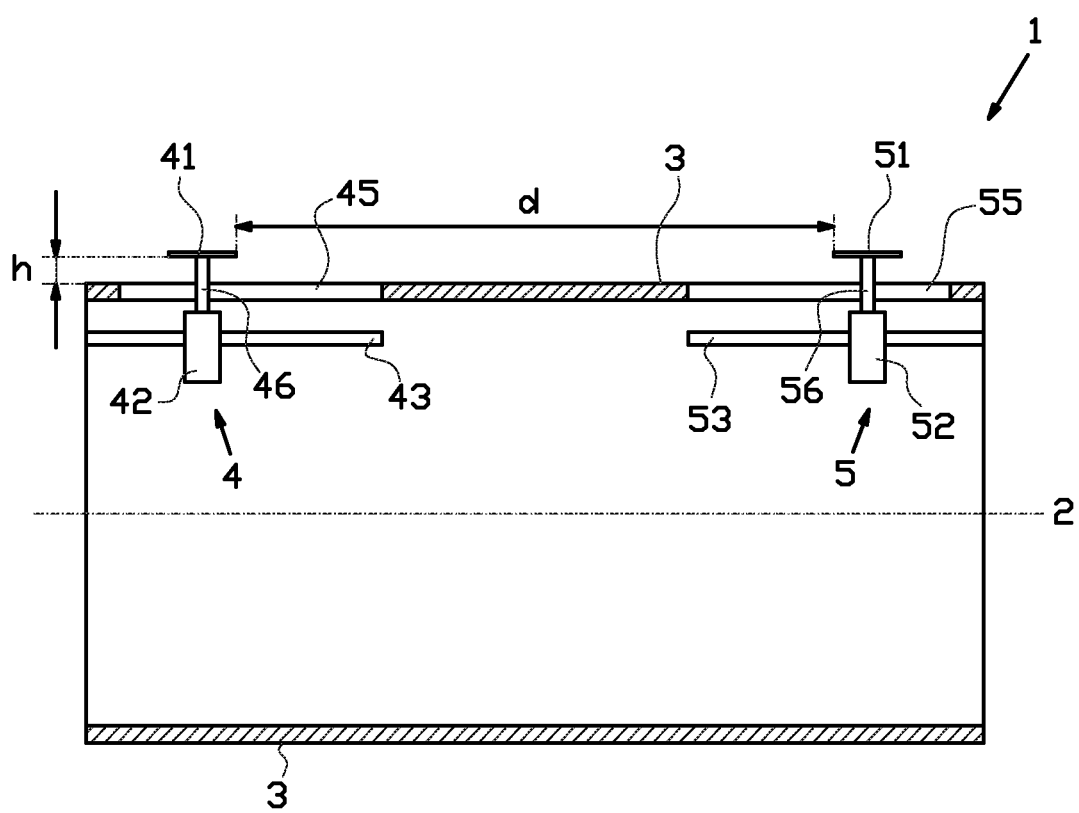

A first example of the apparatus of the invention, in particular a belt and tread drum 1, is shown in FIGS. 1A, 1B and 1C. Said drum 1 is rotatable in a direction r about a drum centre line 2, and comprises a rigid support surface 3 for the tire component. Said support surface 3 is situated at the outward facing circumferential surface of the drum 1. The drum 1 comprises two support members 4, 5 which are arranged spaced apart over a distance d in a substantial longitudinal of said drum 1. The support members 4, 5 each comprises a tread support surface 41, 51 which faces away from the drum centre line 2. The tread support surfaces 41, 51 are radially movable with respect to the rigid support surface between a retracted position wherein the tread support surface 41, 51 is preferably arranged substantially flush with or below the rigid support surface 3, as schematically shown in FIG. 1B, and a raised position wherein the tread support surface 41, 51 is arranged in a radially outward position with respect to the rigid support surface 3, as schematically shown in FIG. 1C.

Each of said support members 4, 5 comprises an actuator 42, 52 for moving the tread support surface 41, 51 between the retracted and the raised position. An example of such an actuator 42, 52 is a pneumatic cylinder which is mounted inside the drum 1. In the example shown in FIGS. 1A, 1B and 1C, the tread support surface 41, 51 is arranged on top of a support shaft 46, 56.

Each of said support members 4, 5 is mounted onto a guiding member 43, 53 for moving the support members 4, 5 and their tread support surfaces 41, 51 in the substantial longitudinal direction 44, 54 of said drum 1. For adjusting the distance d between the tread support surfaces 41, 51 to a width of the one or more belt layers of a specific tire type, the tread support surfaces are moved 44, 54 toward each other or away from each other. At the position of the support members 4, 5, the drum 1, and in particular the rigid support surface 3 thereof, is provided with slits 45, 55 for accommodating the tread support surfaces 41, 51 in the retracted position as shown in FIG. 1B. In the retracted position, the tread support surfaces 41, 51 are arranged substantially flush with or below the rigid support surface 3 to prevent that the tread support surfaces 41, 51 interfere with the conveyor 9 which is used to arrange one or more belt layers 6 around the drum 1.

In an example of an assembly according to the invention, the drum 1 is combined with a stitching device comprising a stitching roll 8 which is arranged for moving in a direction m towards the rigid support surface 3 of the drum 1 for pressing against a tire component which is arranged around said drum 1. The stitching roll 8 is rotatable around a stitching roll centre line 81, which stitching roll centre line 81 is arranged substantially parallel to the drum centre line 2.

The various steps of the method for manufacturing a package of a belt layer and a tread layer into a substantially cylindrical tire component are schematically shown in FIGS. 2A to 5B. These figures only show a partial cross section of the drum 1 of FIGS. 1A, 1B and 1C which comprises the support members 4, 5. FIGS. 2A, 3A, 4A and 5A schematically show the top part of the cross section in longitudinal direction as shown in FIGS. 1B and 1C. FIGS. 2B, 3B, 4B and 5B schematically show the top part of the cross section perpendicular to the drum centre line 2 as shown in FIG. 1A.

First, the tread support surfaces 41, 51 are arranged in the retracted position as shown in FIGS. 2A and 2B. The cylindrical rigid support surface 3 substantially without protruding support members 4, 5 is ready for applying one or more belt layers 6 around said drum 1. The belt layers are supplied by a conveyor 9 for example, and are transferred from the conveyor 9 to the rigid support surface 3 of the drum 1. In the example shown in FIGS. 2A en 2B, four belt layers 6 are arranged on said drum 1. As schematically shown in FIG. 2A, the one or more belt layers 6 are arranged to run between the two tread support surfaces 41, 51.

Subsequently, the tread support surfaces 41, 51 of the support members 4, 5 are moved in radial direction from the retracted position to the raised position as schematically shown in FIGS. 3A and 3B. In this raised position, the tread support surfaces 41, 51 are arranged at a radially outward position with respect to the rigid support surface 3, wherein the height above the rigid support surface 3 of the tread support surfaces 41, 51 in the raised position substantially equal to the thickness of the assembly of belt layers 6.

Then a tread layer 7 is arranged around the belt and tread drum 1 on the assembly of belt layers 6, wherein a leading end 71 and a trailing end 72 of the tread layer 7 overlap at an overlap area OA. The leading end 71 and the trailing end 72 are cut at a sloping angle with respect to the surface of the tread layer 7. The sloping cutting surfaces of the leading end 71 and the trailing end 72 are arranged on the rigid support surface 3 of the belt and tread drum 1 so as to overlap as schematically shown in FIG. 3B, which overlap is also denoted as tread splice. Because the tread layer 7 is wider then the belt layers 6, the edges 73 of the tread layer are not supported by the belt layers 6.

The tread layer 7 is arranged such that the overlap area OA is positioned at least partially on top of said tread support surfaces 41, 51, in particular the part of the tread layer 7 which extends beyond the belt layers 6. Thus the tread support surfaces 41, 51, support the tread edges 73 at the overlap area A at both sides of the assembly of belt layers 6. Thus at the overlap area OA, in particular only locally in the circumferential direction of the belt and tread drum at the overlap area OA, the tread layer 7 is supported substantially over its entire width, as shown in FIG. 3A. The tread layer 7 is considered to be supported locally in the circumferential direction of the belt and tread drum when it is supported by the tread support surfaces 41, 51 at only a part of the circumference of the belt and tread drum at and/or near the overlap area OA and preferably including a small area around the overlap area OA.

Subsequently, the overlapping leading end 71 and trailing end 72 of the tread layer 7 are stitched using a stitching device 8, as schematically shown in FIGS. 4A and 4B. The stitching device 8 comprises a plurality of substantially identical disks 82, wherein each of said disks 82 has at least a rotatable outer circumference for rolling over said tread layer 7, and wherein said disks 82 are individual movable in a radial direction r' relative to the belt and tread drum 1. By using such an array of individual movable disks 82, the stitching device 8 is adaptable to the profile and shape of the tread layer 7 and is able to provide the required pressing force for stitching the leading end 71 and the trailing end 72 together, substantially independent of the contour or shape of the tread layer 7. Moreover, since the tread layer 7 is supported by the assembly of belt layers 6 and the edges 73 of the tread layer 7 are supported by the tread support surfaces 41, 51, the required pressing force for stitching can be applied also on the edges 73 of the tread layer 7. Accordingly the tread splice 74 can be stitched over the complete width of the tread layer 7, substantially without damaging the edges 73 of the tread layer 7. In order to stitch the tread splice 74, the stitching roller 8 only needs to roll over the overlap area OA and applies the required pressing force to the tread layer 7 at the overlap area OA.

After this, the cylindrical tire component comprising one or more belt layers 6 and a tread layer 7 is ready. The tread support surfaces 41, 51 are retracted to the retracted position as shown in FIGS. 5A and 5B. Subsequently the cylindrical tire component is removed from the drum 1 and supplied to a shaping or a carcass drum. The cylindrical tire component is arranged at the outer circumference of the carcass which is already arranged on the shaping or the carcass drum. Then belt layer(s) and tread layer(s) of the cylindrical tire component are stitched onto each other and onto the carcass by means of a stitching roller.

The belt layer(s) and of the tread layer(s) can have several different widths, for example dependent on the specific tire design. So when changing the drum 1 from manufacturing a first tire design to a difference second tire design, the tread support surfaces 41, 51 are moved along the guiding members 43, 53 in the substantial longitudinal direction of said drum 1 toward each other or away from each other for adjusting the distance d between the support members surfaces 41, 51 to a width of the one or more belt layers of the second tire design.

Figure 6A:
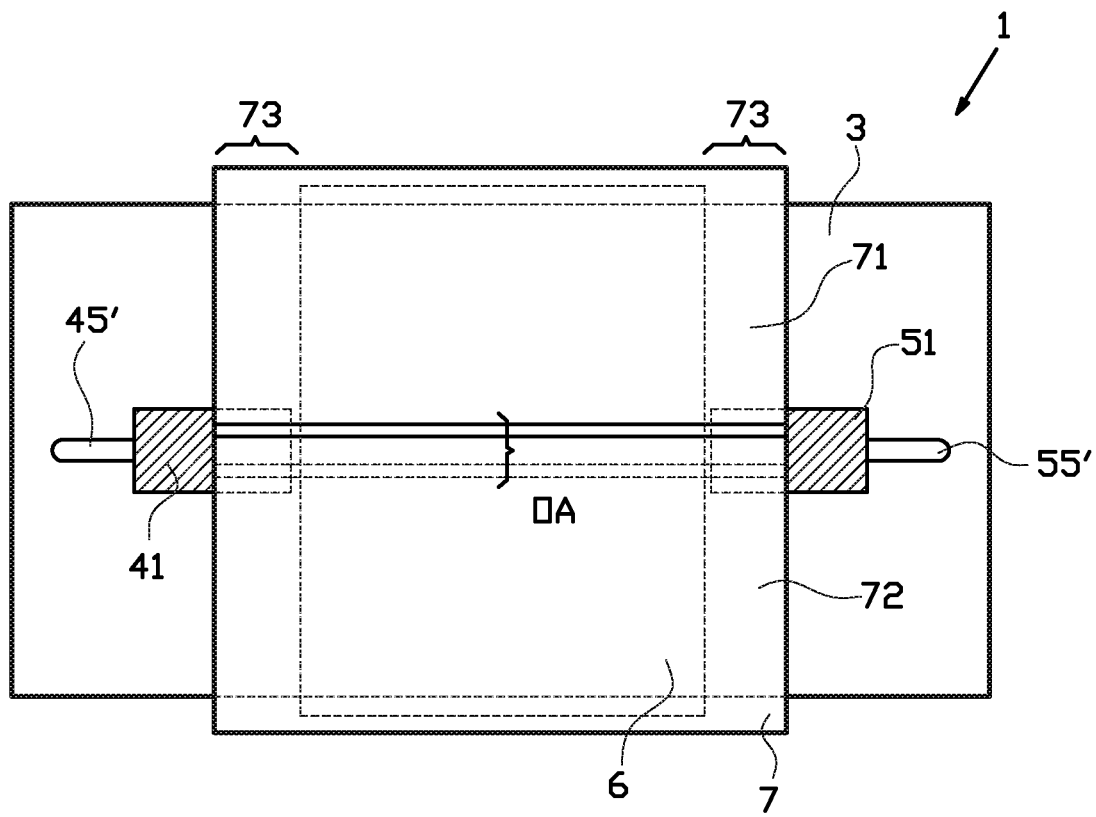
FIG. 6A shows a schematic side view of a second example of a belt and tread drum of the invention.

FIG. 6A shows a schematic side view of a second example of a belt and tread drum 1 according to the invention. The drum 1 comprises a rigid support surface 3 onto which one or more belt layers 6 are arranged. The one or more belt layers 6 are arranged to run between the two support members 41, 51.

Figure 6B:
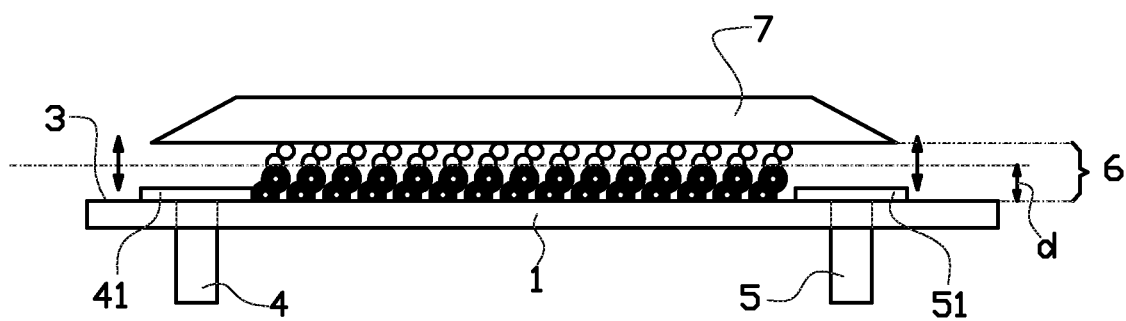
FIG. 6B shows a schematic cross section of the second example of FIG. 6A.

In this second example, the radial thickness of the tread support members 41, 51 is substantially less than the thickness d of the first belt layer arranged on the rigid support surface 3, as schematically shown in FIG. 6B, and the support members 41, 51 can be arranged against and/or abutting the rigid support surface 3 in the retracted position. The protrusion out of the surface of the belt and tread drum 1 by the support members 41, 51 in the retracted position is substantially less than the thickness d of the first belt layer and the belt conveyor 9 can be arranged at a suitable distance to the surface of the belt and tread drum 3 such that the support members 41, in the retracted position do not interfere with the arranging of the belt layer 6 on the belt and tread drum 1, and such that the belt layer 6 is adequately supported by the conveyer 9 and the outer circumferential surface 3 of the belt and tread drum 1 during the transfer. Preferably the distance between the belt conveyor 9 and the support surface 3 of the belt and tread drum 1 is larger than the thickness of the one or more belt layers 6.

It is noted that in the examples shown in the FIGS. 1A to 5B, the slits 45, 55 in the support surface 3 of the drum 1 was large enough in order to move the tread support surfaces 41, 51 into the corresponding slit 45, 55. In the example of FIG. 6, the slits 45', 55' are large enough to accommodate the support shaft of the tread support surfaces 41, 51. Thus in the retracted position, the tread support surfaces 41, 51, are arranged near to the rigid support surface 3, preferably wherein the surface of the tread support surfaces 41, 51 which faces the rigid support surface 3 abuts against said rigid support surface 3 as schematically shown in FIG. 6B. In this exemplary embodiment the slits 45', 55' are narrow, which has the advantage that the part of the slits 45', 55' that extends below the belt layers 6 is narrow, which provide better support of the belt layers 6 by the rigid support surface 3 of the belt and tread drum 1 than wide slits.

On top of the one or more belt layers 6, a tread layer 7 is arranged such that the leading end 71 and a trailing end 72 of the tread layer 7 overlap at an overlap area OA. Because the tread layer 7 is wider then the belt layers 6, the edges 73 of the tread layer are not supported by the belt layers 6. The edges 73 of the overlap area OA are supported by the tread support surfaces 41, 51 as shown in FIGS. 6 and 3B. The further steps in the process for manufacturing a package of a belt layer and a tread layer into a substantially cylindrical tire component, is substantially the same as described in the first example with reference to FIGS. 2A to 5B.

It is to be understood that the above description is included to illustrate the operation of the preferred embodiments and is not meant to limit the scope of the invention. From the above discussion, many variations will be apparent to one skilled in the art that would yet be encompassed by the scope of the present invention.

In summary, the present invention relates to a method and a building drum for manufacturing a package of a belt layer and a tread layer into a substantially cylindrical tire component, wherein the drum is rotatable about a drum centre line and comprises a rigid support surface for the tire component situated at the outward facing circumferential surface of the drum, wherein the drum comprises two support members which are arranged spaced apart in a substantial longitudinal direction of said drum, wherein the support members each comprises a tread support surface which faces away from the drum centre line and which tread support surfaces are radially movable between a retracted position wherein the tread support surface is arranged at or near the rigid support surface, and a raised position wherein the tread support surface is arranged in a radially outward position with respect to the rigid support surface.

The invention claimed is:

1. A method for manufacturing a package of a belt layer and a tread layer into a cylindrical tire component, wherein the method comprises the steps of:
providing a belt and tread drum which is rotatable about a drum centre line, and comprises a rigid support surface for the tire component, wherein said support surface is situated at the outward facing circumferential surface of the drum, wherein the belt and tread drum comprises two support members which are arranged spaced apart in a longitudinal direction of said drum, wherein the support members each comprises a tread support surface which faces away from the drum centre line and which tread support surfaces are radially movable with respect to the rigid support surface, wherein the tread support surfaces are movable in the longitudinal direction of said drum towards each other and away from each other, for adjusting the distance between the support members, wherein the support members are arranged in a retracted position wherein the tread support surfaces are arranged at or near the rigid support surface,
arranging one or more belt layers around the belt and tread drum on the rigid support surface, wherein the one or more belt layers are arranged to run between the two support members,
moving the tread support surfaces in the longitudinal direction of said drum toward each other or away from each other for adjusting the distance between the support members to a width of the one or more belt layers,
moving the support members into a raised position with respect to the rigid support surface wherein the tread support surfaces are arranged at a radially outward position with respect to the rigid support surface,
arranging a tread layer around the belt and tread drum on the one or more belt layers while the support members are into the raised position, wherein a leading end and a trailing end of the tread layer overlap at an overlap area, wherein the tread layer is arranged such that the overlap area is positioned partially on top of said tread support surfaces, and
using a stitching device comprising a stitching roll to stitch the overlapping leading end and trailing end of the tread layer together.

2. The method according to claim 1, wherein a radial distance between the tread support surfaces in the raised position and the rigid support surface is adjusted to the thickness of the one or more belt layers for a specific tire design.

3. The method according to claim 1, wherein the support members in the retracted position are arranged against and/or abutting the rigid support surface.

4. The method according to claim 1, wherein both support members are arranged along a support member centre line which extends parallel to the drum centre line.

5. The method according to claim 1, wherein the stitching roll is rotatable around a stitching roll centre line, wherein the stitching roll centre line is arranged parallel to the drum centre line.

6. The method according to claim 1, wherein the stitching roll comprises a plurality of identical disks, wherein each of said disks has at least a rotatable outer circumference, and wherein said disks are individually movable in a radial direction relative to the belt and tread drum.

7. The method according to claim 1, wherein the tread layer is wider than the one or more belt layers and the edges of the tread layer in the longitudinal direction of the belt and tread drum are not supported by the one or more belt layers, wherein the tread support surfaces support the edges of the tread layer of the belt and tread drum at the overlap area at both sides of the one or more belt layers in the raised position.

8. The method according to claim 7, wherein the tread support surfaces support the edges of the tread layer only locally in the circumferential direction of the belt and tread drum at the overlap area at both sides of the one or more belt layers in the raised position.

9. The method according to claim 7, wherein the tread support surfaces support the edges of the tread layer only at the overlap area at both sides of the one or more belt layers in the raised position.

* * * * *